(12) United States Patent
Yoon et al.

(10) Patent No.: US 12,675,515 B2
(45) Date of Patent: Jul. 7, 2026

(54) CUSTOMIZING LARGE LANGUAGE MODELS FOR INFORMATION RETRIEVAL

(71) Applicant: Google LLC, Mountain View, CA (US)

(72) Inventors: Jinsung Yoon, San Jose, CA (US);
Sercan Omer Arik, San Francisco, CA
(US)

(73) Assignee: Google LLC, Mountain View, CA (US)

( * ) Notice: Subject to any disclaimer, the term of this
patent is extended or adjusted under 35
U.S.C. 154(b) by 134 days.

(21) Appl. No.: 18/654,696

(22) Filed: May 3, 2024

(65) Prior Publication Data

US 2024/0378224 A1 Nov. 14, 2024

Related U.S. Application Data

(60) Provisional application No. 63/465,145, filed on May
9, 2023.

(51) Int. Cl.
*G06F 16/33* (2025.01)
*G06F 16/332* (2019.01)
*G06F 16/334* (2025.01)

(52) U.S. Cl.
CPC ........ *G06F 16/3347* (2019.01); *G06F 16/332*
(2019.01)

(58) Field of Classification Search
CPC .......................... G06F 16/3347; G06F 16/332
See application file for complete search history.

(56) References Cited

U.S. PATENT DOCUMENTS

| | | | | |
|---|---|---|---|---|
| 11,016,997 B1 * | 5/2021 | Huang | .................. | G06F 16/285 |
| 2019/0377792 A1 * | 12/2019 | Zhang | .................. | G06N 3/0442 |
| 2020/0311542 A1 * | 10/2020 | Wang | .................... | G06F 16/245 |

FOREIGN PATENT DOCUMENTS

| | | | |
|---|---|---|---|
| EP | 4 141 696 | * | 3/2023 |
| JP | 2020-052783 | * | 4/2020 |
| WO | WO 2022/264622 | * | 12/2022 |

OTHER PUBLICATIONS

Machine translation for WO 2022/264622 (Year: 2022).*
Machine translation for JP 2020-052783 (Year: 2018).*

* cited by examiner

*Primary Examiner* — Qian Yang
(74) *Attorney, Agent, or Firm* — Lerner David LLP

(57) ABSTRACT

Aspects of the disclosed technology include techniques and
mechanisms for customizing large language models (LLMs)
for information retrieval (IR). For a plurality of (query,
corpus) pairs, an IR adapter may generate embeddings and
adapted embeddings associated with each of the query and
the corpus. The IR adapter may analyze the adapted embed-
dings using a similarity function to determine the similarity
between the adapted embeddings. The output of the simi-
larity function may be used to determine a correlation
between the query and the corpus, wherein the correlation
may be fed back into the IR adapter to train an LLM.

20 Claims, 4 Drawing Sheets

CUSTOMIZING LARGE LANGUAGE MODELS FOR INFORMATION RETRIEVAL

CROSS-REFERENCE TO RELATED APPLICATIONS

This application claims the benefit of the filing date of U.S. Provisional Patent Application No. 63/465,145 filed May 9, 2023, the disclosure of which is hereby incorporated herein by reference.

Information retrieval (IR) includes searching for information by querying a corpus database, wherein the corpus database includes various classes and subclasses of data, such as documents, webpages, or logs. IR has applications across various industries, such as technology, healthcare, or finance. Current IR methods and techniques utilize language modeling based on queries and corpora in text form, and a relevant corpus can be ranked based on the similarity between queries and a corpus. Pre-trained large language models (LLMs) have demonstrated significant achievements in a variety of text processing tasks. Pre-trained LLMs cannot be further trained using labeled samples, such as (query, corpus) pairs since the parameters used to train the pre-trained LLMs are protected within black boxes of the embedding LLMs and are not subject to modification. However, the modification of the parameters used to train the LLMs, such as the addition of labeled samples, can significantly improve the functionality and accuracy of LLMs during IR.

SUMMARY

The present disclosure proposes an IR adapter, which integrates a small adapter network on top of fixed large language embedding models to modify pre-trained text embeddings that are customized for a given dataset. The disclosure further provides differentiable ranking loss that can directly utilize the information of positive (query, corpus) pairs. Ranking loss and multiple regularizers may be included to improve generalization and to improve IR performance without overfitting and forgetting.

One advantage of the proposed method is that it does not require access to the parameters of the pre-trained embedding model. The IR adapter can be trained using inference outputs of the embedding model, which can significantly improve the performance of retrieval. The IR adapter can be used to further improve black-box embedding models that do not provide access to their models. Full fine-tuning, including tuning all the weights of a model, can be one way of utilizing the labeled information. Other parameter-efficient fine-tuning methods, such as prompt tuning, LoRA, partial fine-tuning, and various adapters, may fine-tune a subset of the parameters in LLMs. However, full fine-tuning and the other parameter-efficient fine-tuning models require access to the parameters within the black-box embedding models.

One aspect of the disclosure provides an information retrieval (IR) adapter for customizing large language models (LLMs), the IR adapter comprising: one or more processors; and memory comprising instructions, which, when executed, cause the IR adapter to: encode, using at least one LLM encoder, a query and a corpus; generate, based on the encoding, a query embedding of the query and a corpus embedding of the corpus; determine a vector similarity between an adapted query embedding and an adapted corpus embedding; and determine, based on the vector similarity, an adapted relevance score between the adapted query embedding and the adapted corpus embedding.

According to some examples, the query embedding is a numerical vector comprising data that corresponds to the query. According to some examples, the corpus embedding is a numerical vector comprising data that corresponds to the corpus. In either of the foregoing embodiments, the instructions, when executed, further cause the IR adapter to transform, using a query adapter, a numerical vector comprising data that corresponds to the query to the adapted query embedding. In the foregoing embodiments, the transforming further causes the IR adapter to determine, using a skip connection, a difference between the numerical vector comprising data that corresponds to the query and the adapter query embedding. In the foregoing embodiments, the instructions, when executed, further cause the IR adapter to minimize, using at least one recovery loss regularizer, the difference between the numerical vector comprising data that corresponds to the query and the adapter query embedding.

According to some examples, the instructions, when executed, further cause the IR adapter to transform, using a corpus adapter, a numerical vector comprising data that corresponds to the corpus to the adapted corpus embedding. In the foregoing embodiment, the instructions, when executed, further cause the IR adapter to determine, using a skip connection, a difference between the numerical vector comprising data that corresponds to the corpus and the adapted corpus embedding. In the foregoing embodiments, the instructions, when executed, further cause the IR adapter to minimize, using at least one recovery loss regularizer, the difference between the numerical vector comprising data that corresponds to the corpus and the adapted corpus embedding.

According to some examples, the vector similarity is determined using a cosine similarity function. According to some examples, the determining the adapted relevance score further causes the IR adapter to determine a relationship between the query and the corpus, wherein the relationship is one of a positive relationship or a negative relationship. In the foregoing embodiments, the determining the relationship between the query and the corpus further causes the IR adapter to compare the adapted relevance score to a ground truth score, wherein the ground truth score indicates a level of correlation between the query and the corpus. In the foregoing embodiments, an optimal adapted relevance score corresponds to the adapted relevance score of a same order as a ground truth relevance score. In the foregoing embodiments, the instructions, when executed, further cause the IR adapter to: compare the adapted relevance score to the ground truth relevance score; and penalize an LLM for predicting a low adapted relevance score when the adapted relevance score is expected to be equal to or greater than the ground truth relevance score.

In the foregoing embodiments, the penalty is proportional to a difference between the adapted relevance score and the ground truth relevance score. In the foregoing embodiments, the instructions, when executed, further cause the IR adapter to not penalize an LLM when the adapted relevance score is equal to or greater than the ground truth relevance score.

Another aspect of the disclosure provides a method for customizing large language models (LLMs), the method comprising: encoding, by an information retrieval (IR) adapter and using at least one LLM encoder, a query and a corpus; generating, by the IR adapter and based on the encoding, a query vector and a corpus vector; determining, by the IR adapter, a vector similarity between an adapted query vector and an adapted corpus vector; and determining, by the IR adapter and based on the vector similarity, an adapted relevance score between the query and the corpus.

According to some examples, the determining the adapted relevance score further comprises determining a relationship between the query and the corpus, wherein the relationship is one of a positive relationship or a negative relationship.

According to some examples, the method further comprises transforming, by the IR adapter and using a query adapter, a numerical vector comprising data that corresponds to the query to the adapted query embedding.

According to some examples, an optimal adapted relevance score corresponds to the adapted relevance score of a same order as a ground truth relevance score.

DETAILED DESCRIPTION

Figure 1:
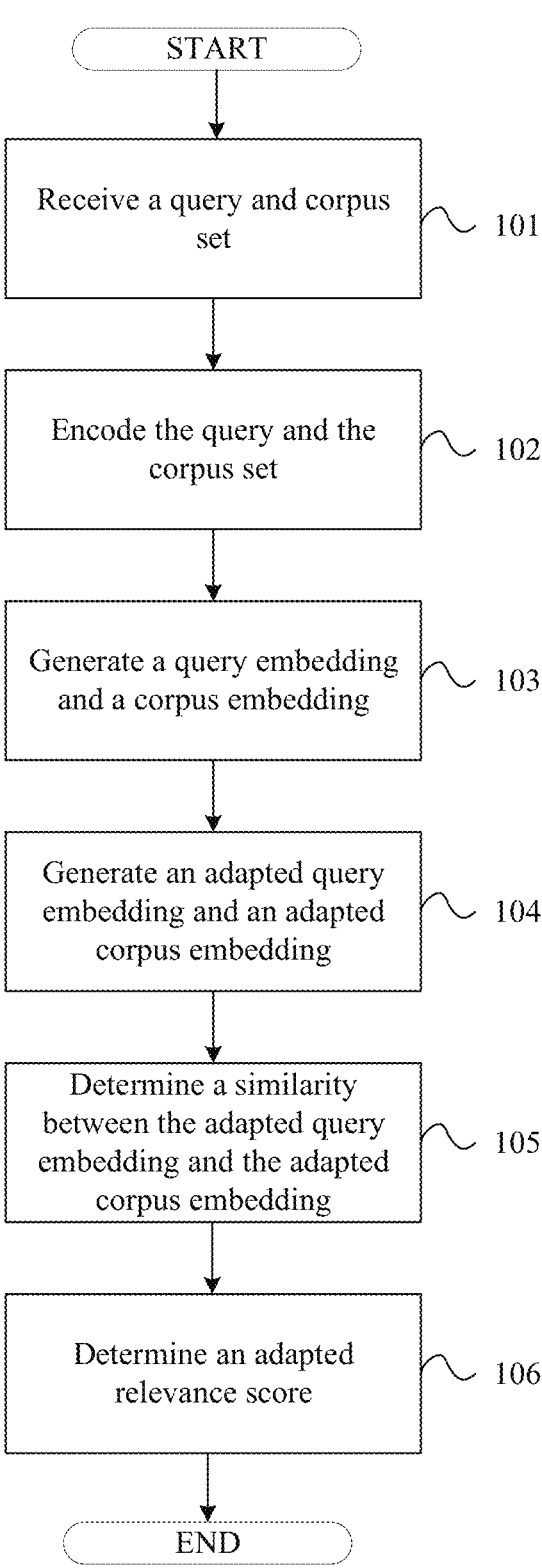
FIG. 1 illustrates an example method or process for customizing LLMs for information retrieval, in accordance with an aspect of the disclosed technology.

Aspects of the disclosed technology provide a technique and mechanism for customizing large language models (LLMs) for information retrieval. In particular, the technique and mechanism described herein integrate an information retrieval (IR) adapter into fixed large language embedding models to alter pre-trained and previously customized embedding models. The IR adapter may generate (query, corpus) pairs based on receiving a query and a corpus set. The (query, corpus) pairs may be either positive pairs or negative pairs, both of which may be used to train LLMs. A positive (query, corpus) pair may indicate a positive relationship between the query and the data within the corpus, which may indicate that the query and the corpus are correlated. For example, a positive (query, corpus) pair may indicate that the query may be satisfied by the data within the corpus. Additionally or alternatively, a negative (query, corpus) pair may indicate a negative relationship between the query and the data within the corpus, which may indicate that the query and the corpus are not correlated. For example, a negative (query, corpus) pair may indicate that the query might not be satisfied based on the data within the corpus and/or that additional queries or a different corpus may be needed to satisfy the query.

As discussed below, the IR adapter may extract query and corpus pairs from pre-trained embedding models, but might not require access to the parameters used to train the pre-trained embedding models. The IR adapter may use inference outputs of the pre-trained embedding models to execute the method and process described herein. As such, the method and process described herein may further improve embedding models that restrict access to training parameters used to train each embedding model since the IR adapter does not require full access to training parameters.

The IR adapter described herein may modify pre-trained LLMs and may be integrated into any pre-trained LLM.

Furthermore, the method and process described herein may overcome challenges associated with full fine-tuning labeled training data to further improve embedding models. Fine-tuning embedding models on data sets containing limited labeled training data may result in the weights of an embedding model overfitting the labeled training data, thereby skewing how the labeled training data generalizes to distribution shifts. Full fine-tuning may also be accompanied by economic and computational constraints in that full fine-tuning may be expensive and may require a large memory. Alternative fine-tuning methods, such as prompt tuning, partial fine-tuning, or other adapters, may fine-tune a subset of the parameters used to train the pre-trained embedding models, may reduce the risk of overfitting, and may provide computational gains. However, the alternative fine-tuning methods might not be suitable for generating LLM parameters and training LLMs since the alternative fine-tuning methods may require full access to the parameters used to train the pre-trained embedding models and the LLMs, and since access to such parameters is hindered by black boxes within the pre-trained embedding models. Therefore, the process and method described herein may further improve embedding models that use fine-tuning methods.

As discussed below, the IR adapter may use regularizers to improve data generalization and to monitor whether information from the pre-trained embedding models is considered in the method and process of training LLMs and customizing the LLMs for IR. The IR adapter may also use additional adapters to modify data extracted from pre-trained embedding models to maximize IR.

FIG. 1 illustrates an example method or process for customizing LLMs for information retrieval, in accordance with an aspect of the disclosed technology. The operations described herein are presented in the current order by way of example and the order of operations is not meant to be limiting. The operations recited herein may be performed in a different order and operations may be added, removed, and/or modified.

Figure 2:
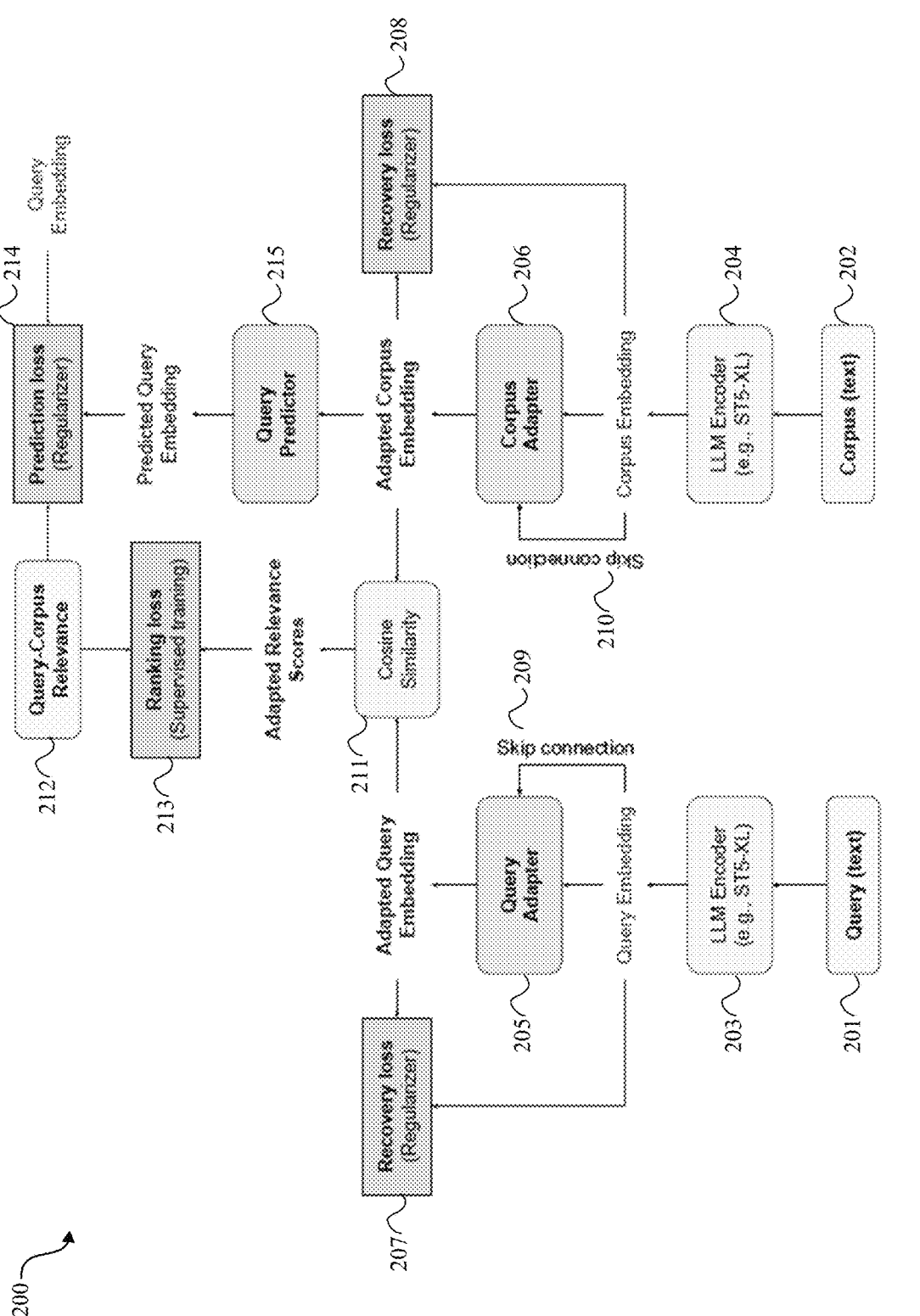
FIG. 2 illustrates an example IR adapter for customizing LLMs for information retrieval, in accordance with an aspect of the disclosed technology.

The example method or process illustrated in FIG. 1 is discussed in conjunction with FIG. 2, which illustrates an example IR adapter for customizing LLMs for information retrieval, in accordance with an aspect of the disclosed technology.

At block 101, the IR adapter may receive a query, such as query 201, wherein the query may be in text form. The query may be generated by a user computing device and may request a particular class or subclass of information from a corpus database. The corpus database may include enterprise organization data that corresponds to different enterprise organization endeavors, such as enterprise organization operations, enterprise organization products, enterprise organization services, or the like.

The IR adapter may also receive a corpus, such as corpus 202, wherein the corpus may correspond to a particular class or a particular subclass of information from the corpus database, such as a particular enterprise organization product. In some instances, the portion of the corpus database received by the IR adapter may be the portion of the corpus database that is most closely related to the query. For example, where the query requests the display of a particular product, the portion of the corpus database that the IR adapter may receive may include data and/or metadata related to the requested product.

At block 102, the received query and the received corpus may be processed using an LLM encoder, such as LLM encoders 203 and 204. In some instances, the LLM encoder may be a Sentence-T5-XL encoder. The LLM encoder may parse the received input and may perform a semantic search on the received input to determine a meaning of the received input. The LLM encoder may map the syntax and semantics of the received input to a vector space, such an embedding space.

At block 103, the encoded query and the encoded corpus may be used to generate a query embedding and a corpus embedding, respectively. The query embedding may be a numerical vector representation of the encoded query, which may be denoted as $Q=\{q_1, \ldots, q_N\}\in Q$. The corpus embedding may be a numerical vector representation of the encoded corpus, which may be denoted as $C=\{c_1, \ldots, c_N\}\in C$. The IR adapter may identify a relationship between the received query $(q_i)$ and the received corpus $(c_j)$. A predicted relationship between $(q_i)$ and $(c_j)$ may be highly correlated with a ground truth relationship $(y_{ij})$.

As discussed below, a scoring function denoted as $f:Q\times C\to R$ may take the received query and the received corpus as an input and may output a score estimate on the relationship between them. The relationship between the query and the corpus may be either a positive relationship or a negative relationship. Each positive relationship between the query and the corpus may be denoted as a triplet, such as $r_{ij}=(q_i, c_j, y_{ij})$, where $y_{ij}$ may represent the strength of the relationship between the query and the corpus. All other combinations may be considered negative relationships, such as instances where $y_{ij}=0$. The set of all query-corpus relationships may be denoted as $R=\{(q_i, c_j, y_{ij})\}_{i=1:N; j=1; M}=R_p\cup R_n$, where $R_p=\{(q_i, c_j, y_{ij})\}\in R|y_{ij}>0\}$ may represent a set of positive relationships and where $R_n=\{(q_i, c_j, y_{ij})\}\in R|y_{ij}=0\}$ may represent a set of negative relationships.

In some instances, the IR adapter may extract raw text from a pre-trained embedding model that may be used to convert raw text into embeddings. Extracting query and corpus embeddings from the pre-trained embedding model may be denoted using the following function, where the pre-trained embedding model is denoted as E and the extraction is denoted as $Q_E=\{qe_1, \ldots, qe_N\}\in R^d$ and $C_E=\{ce_1, \ldots, ce_N\}\in R^d$, where $qe_i=E(q_i)$ and $ce_j=E(c_j)$. In such instances, the query embedding and the corpus embedding may be within the same embedding space.

At block 104, the query embedding and the corpus embedding may be used to generate an adapted query embedding and an adapted corpus embedding, respectively. The IR adapter may use a query adapter, such as query adapter 205, to generate the adapted query embedding and may use a corpus adapter, such as corpus adapter 206, to generate the adapted corpus embedding. The adapted embeddings may be determined using a learnable adaptation function, which may be denoted as $f:R^d\to R^d$. The learnable adaptation function may be used to map the query embedding and the corpus embedding to adapted embeddings that may be more favorable to IR applications. The adapted query embeddings may be denoted as $\hat{Q}_E=\{\widehat{qe}_1, \ldots, \widehat{qe}_N\}\in R^d$ and the adapted corpus embeddings may be denoted as $\hat{C}_E=\{\widehat{ce}_1, \ldots, \widehat{ce}_M\}\in R^d$, where $\widehat{qe}_i=f(qe_i)$ and where $\widehat{ce}_j=f(ce_j)$.

The IR adapter may use at least one regularizer to minimize the difference between the query embedding and the adapted query embedding and to minimize the difference between the corpus embedding and the adapted corpus embedding. In some instances, the at least one regularizer may be configured to avoid losing information extracted from the pre-trained embedding models, such as the pre-trained LLM embedding models.

For example, the IR adapter may use a recovery regularizer (or recovery loss regularizer), such as recovery loss regularizers 207 and 208, to avoid over-modifying the query embedding and the corpus embedding when generating the adapted query embedding and the adapted corpus embedding. The recovery regularizer may be denoted as:

$$L_{Recovery} = \frac{1}{N}\sum_{i=1}^{N} \left\|\widehat{qe}_i - qe_i\right\|_1 + \frac{1}{M}\sum_{j=1}^{M} \left\|\widehat{ce}_j - ce_j\right\|_1,$$

wherein $\widehat{qe}_i$ is the adapted query embedding, $qe_i$ is the query embedding, $\widehat{ce}_j$ is the adapted corpus embedding, and $ce_j$ is the corpus embedding. The recovery regularizer may monitor the process of generating the adapted embeddings to keep the adapted query embedding and the adapted corpus embedding similar to the query embedding and the corpus embedding.

The recovery regularizer may analyze each (query, corpus) pair. A (query, corpus) pair may correspond to a mapping of the query to each piece of data within the corpus. In instances where the query mapping of block 102 is mapped to multiple embedding spaces, each (query, corpus) pair may correspond to a single query component mapped to different pieces of data within the corpus.

Additionally or alternatively, the IR adapter may use a skip connection, such as skip connections 209 and 210, to identify modifications between the query embedding and the adapted query embedding, and between the corpus embedding and the adapted corpus embedding. The skip connection may map the query embedding to the adapted query embedding to identify where the adapted query embedding may differ. Similarly, the skip connection may map the corpus embedding and the adapted corpus embedding to identify where the adapted corpus embedding may differ. In some instances, the skip connection may run the delta between the query embedding and the adapted query embedding, and the delta between the corpus embedding and the adapted corpus embedding to identify where the adapted embeddings may differ. In some instances, the skip connection that maps the difference between the query and corpus embeddings and the adapted query and corpus embeddings may be denoted as $\widehat{qe}_i=qe_i+f(qe_i)$ and $\widehat{ce}_j=qe_j+f(qe_j)$.

At block 105, the adapted embeddings may be used to determine a similarity between the query and the corpus. In particular, the IR adapter may determine the similarity between the query and the corpus for each determined (query, corpus) pair. The IR adapter may use a similarity function, such as cosine similarity function 211, to quantify the similarities between the query and the data within the corpus. The cosine similarity function may be denoted as CosineSimilarity$(\widehat{qe}_i, \widehat{ce}_j)$. The output of the cosine similarity function may be interpreted to determine whether the data in the corpus corresponds to the query. In particular, the output of the cosine similarity function may be interpreted to determine whether the data in the corpus provides a response to the query, does not provide a response to the query, does not contain sufficient information to respond to the query, or the like.

At block 106, the output of the cosine similarity function may be used to gauge an accuracy of the pre-trained model and to further train an LLM. The output of the cosine similarity function may be an adapted relevance score for each (query, corpus) pair, which may be denoted as $s_{ij}$=CosineSimilarity($\widehat{qe}_i$, $\widehat{ce}_j$). The adapted relevance scores may be used to further train the LLM to identify and handle the (query, corpus) pairs analyzed above that might not have been analyzed in the pre-trained embedding models.

The IR adapter may analyze each adapted relevance score to determine an accuracy of each score, wherein the accuracy determinations may be used to further train the LLM. For example, the IR adapter may penalize the LLM for determining an adapted relevance score that is lower than an expected score. The expected score may be referred to as a ground truth relevance score, which may indicate an expected relevance score of each (query, corpus) pair. The IR adapter may receive determined values of each ground truth relevance score, as illustrated by query-corpus relevance 212, and may use the received values to further train the LLM.

The adapted relevance score of each (query, corpus) pair may be used to optimize the learnable adaptation function $f$ using a ranking loss model, such as ranking loss supervised training model 213, which may be denoted as $$L_{Rank} = \sum_{i=1}^{N} \sum_{j=1}^{M} \sum_{k=1}^{M} I(y_{ij} > y_{ik}) * (y_{ij} - y_{ik}) * \max(0, s_{ik} - s_{ij}),$$

where the function is equal to 1 if and only if $y_{ij} - y_{ik}$, otherwise the function is equal to 0. The IR adapter may compare the adapted relevance score of a (query, corpus) pair to a ground truth relevance score associated with the (query, corpus) pair. The ground truth relevance may be an expected relevance score of each (query, corpus) pair. An optimal adapted relevance score of a (query, corpus) pair may be an adapted relevance score of the same order as a ground truth relationship for each query. In some instances, the optimal adapted relevance score of the (query, corpus) pair may be an adapted relevance score of the same order as the ground truth relevance score associated with the (query, corpus) pair.

If, for a (query, corpus) pair, the LLM determines an adapted relevance score that is lower than a ground truth relevance score for the (query, corpus) pair, then ranking loss supervised training model 213 may penalize the LLM. The penalty may be proportional to the difference between the adapted relevance score and the ground truth relevance score for the (query, corpus) pair. Penalizing the LLM may also instruct the LLM to predict, in future iterations of the described method or process, greater adapted relevance scores for the (query, corpus) pairs associated with higher ground truth relevance scores.

Alternatively, if the LLM determines the adapted relevance score is equal to or greater than an expected ground truth relevance score for the (query, corpus) pair, then ranking loss supervised training model 213 might not penalize the LLM. The IR adapter may use the feedback from ranking loss supervised training model 213 to further refine the method or process described herein.

In some implementations, the method or process described herein may be used to predict a query based on a corpus. The IR adapter may feed the query embedding performed in block 104 to prediction loss regularizer 214. The IR adapter may use prediction loss regularizer 214 in instances where the corpus is relevant to a particular query. Prediction loss regularizer 214 may use a prediction function, which may be denoted as $$L_{Pred} = \frac{1}{\sum_{i=1}^{N} \sum_{j=1}^{M} y_{ij}} \sum_{i=1}^{N} \sum_{j=1}^{M} y_{ij} * \left\| \widehat{qe}_i - p(\widehat{ce}_j) \right\|_1,$$

where p: $R^d \rightarrow R^d$ predicts the query given the corpus. The query may be predicted based on adapted corpus embeddings. The outcome of the prediction function may be used to further train the prediction function and to train the adaptation function, discussed above.

Query predictor 215 may use the prediction function and the outcome(s) of the prediction function to predict a query based on adapted corpus embeddings. The IR adapter may feed the adapted corpus embeddings, generated in block 104, to query predictor 215 along with instructions to identify a relevant query based on analyzing the correlation between the adapted corpus embedding and a plurality of possible queries.

The adaptation and prediction functions may be optimized by minimizing a loss function, which may be denoted as $f^*p^*=$arg arg $\min_{f,p} L_{Rank}(f) + \alpha L_{Recovery}(f) + \beta L_{pred}(p)$, where $\alpha$ and $\beta$ may control different hyper-parameters that control the importance of different loss terms.

As discussed above, the optimal adapted relevance score may be used to evaluate the performance of an LLM trained in accordance with the method or process described herein. For example, a performance evaluation function may be a discounted cumulative gain (DCG) function and may be denoted as $$DCG(y, s) = \sum_i \frac{y_i}{\text{rank}(s_i) + 1},$$

where s is the adapted relevance score determined in accordance with the method or process described herein and y is the ground truth label. A comparison of the optimal case and the ground truth label may be denoted as $$nDCG(y, s) = \frac{DCG(y, s)}{DCG(y, y)},$$

where the denominator is the optimal case where the ranking of the scores(s) is the same as the ranking of the ground truth label (y).

The evaluation of the LLM trained in accordance with the method or process described herein may be conducted using test datasets, such as 14 BEIR retrieval datasets. The performance of the LLM may be evaluated when the IR adapter described herein is embedded into available IR APIs. The performance of the LLM may be further evaluated over different language models, such as different Sentence-T5-XL models.

Figure 3:
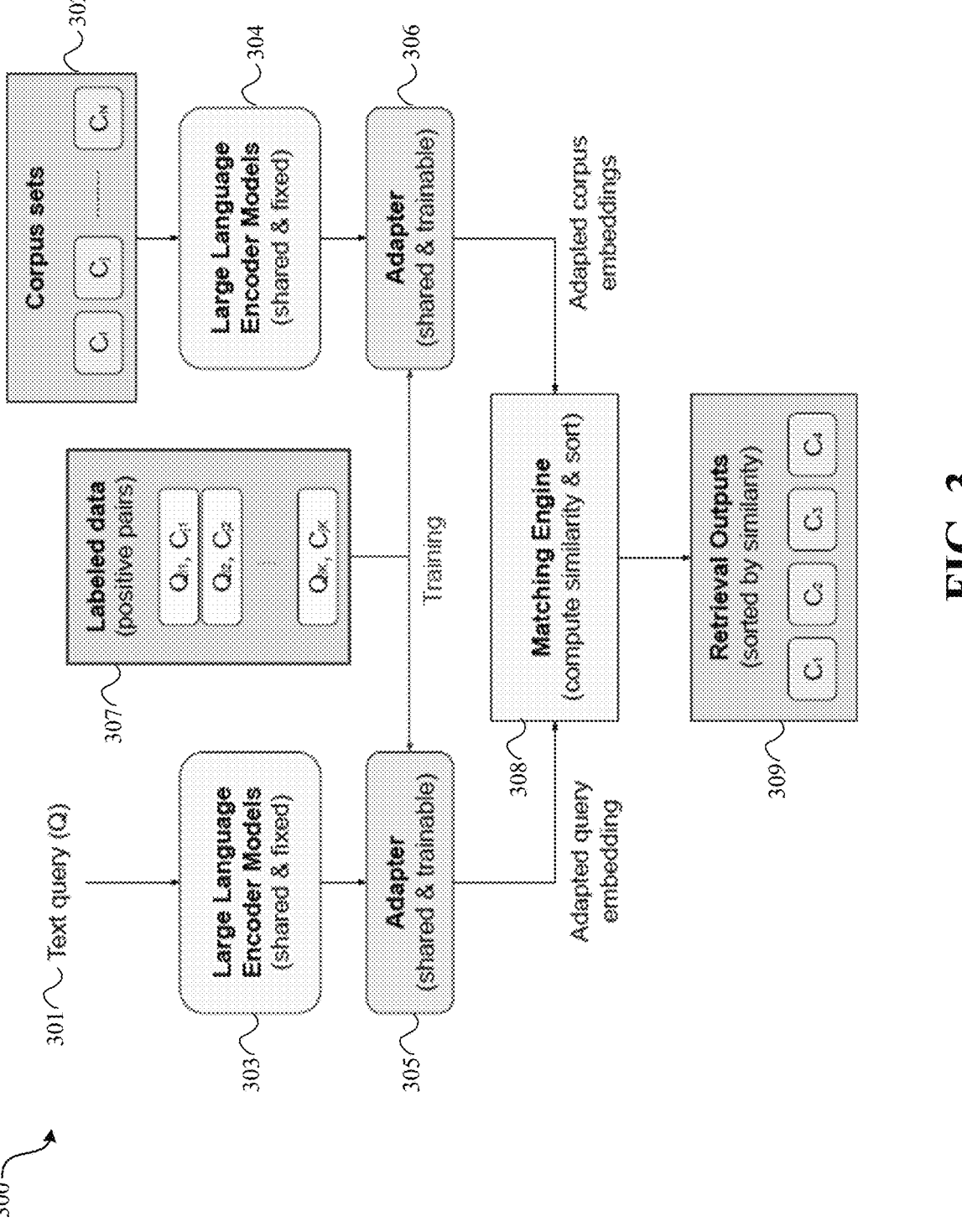
FIG. 3 illustrates another example of the IR adapter for customizing LLMs for information retrieval, in accordance with an aspect of the disclosed technology.

FIG. 3 illustrates another example of the IR adapter for customizing LLMs for information retrieval, in accordance with an aspect of the disclosed technology. As illustrated in FIG. 3, the IR adapter may receive a query, such as query 301, wherein the query may be in text form. The IR adapter may also receive corpus sets (referred to generally as a corpus), such as corpus 302. The corpus may contain different classes and subclasses of enterprise organization data.

The received query and the received corpus may be fed as input into large language encoder models, such as an ST5-XL encoder. In particular, the query and the corpus may be fed into distinct large language encoder models, such as models 303 and 304. The large language encoder models might not be trainable. Models 303 and 304 may encode the query and the corpus.

The encoded query and the encoded corpus may be fed as input to distinct adapters, such as adapters 305 and 306. In some instances, an adapter, such as adapter 305, may receive the encoded query and may use the encoded query to generate a query embedding, wherein the query embedding may correspond to a numerical vector representation of the encoded query. Further, in some instances, an adapter such as adapter 306 may receive the encoded corpus and may use the encoded corpus to generate a corpus embedding, wherein the corpus embedding may correspond to a numerical vector representation of the encoded corpus. In both instances, adapters 305 and 306 may receive labeled training data, such as labeled (query, corpus) pairs generated during previous iterations of the process or method described herein. The labeled (query, corpus) pairs may correspond to positive (query, corpus) pairs, wherein the positive (query, corpus) pairs may indicate that the query correlates to the corpus.

The query embedding and the corpus embedding generated by adapters 305 and 306 may be converted to adapted embeddings, such as an adapted query embedding and an adapted corpus embedding. The adapted embeddings may correspond to a modified query embedding and a modified corpus embedding.

The IR adapter may use at least one regularizer to minimize the difference between the query embedding and the adapted query embedding and to minimize the difference between the corpus embedding and the adapted corpus embedding. In some instances, the at least one regularizer may be configured to avoid losing information that may be extracted from pre-trained embedding models, such as pre-trained LLM embedding models. A recovery regularizer (or recovery loss regularizer) may be used to avoid over-modifying the query embedding and the corpus embedding when generating the adapted query embedding and the adapted corpus embedding.

The adapted embeddings may be fed as input to a matching engine, such as matching engine 308. The IR adapter may use matching engine 308 to determine a similarity between the adapted query embedding and the adapted corpus embedding. The IR adapter may determine the similarity using at least one similarity function, such as a cosine similarity function.

The output of the cosine similarity function may be an adapted relevance score for each (query, corpus) pair. The output of the cosine similarity function may be interpreted to determine whether the data in the corpus corresponds to the query. In particular, the output of the cosine similarity function may be interpreted to determine whether the data in the corpus provides a response to the query, does not provide a response to the query, does not contain sufficient information to respond to the query, or the like.

The IR adapter may analyze each adapted relevance score to determine an accuracy of each score. The IR adapter may penalize an LLM for determining an adapted relevance score that is lower than an expected score. The expected score may be referred to as a ground truth relevance score, which may indicate an expected relevance score of each (query, corpus) pair. The IR adapter might not penalize the LLM for determining the adapted relevance score is equal to or greater than the ground truth relevance score for the (query, corpus) pair. The IR adapter may sort the determined adapted relevance scores based on the described analysis and the described penalties.

The output of matching engine 308 may result in IR outputs, indicated as retrieval outputs 309. As discussed above, the retrieval outputs may be sorted based on the output of the similarity function used by the IR adapter.

Figure 4:
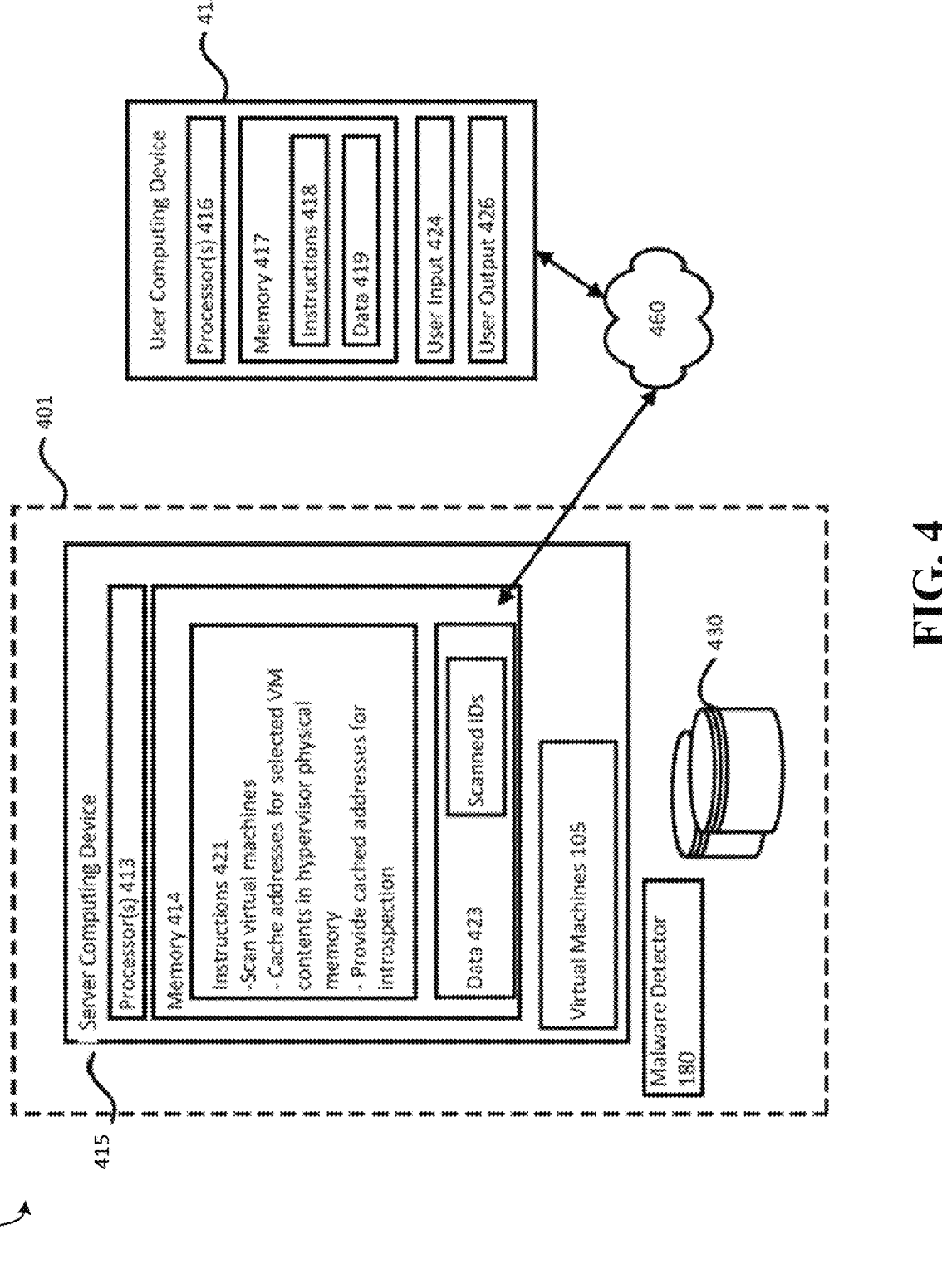
FIG. 4 illustrates an example computing environment implementing the IR adapter that can be used for customizing LLMs for information retrieval, according to aspects of the disclosure.

FIG. 4 illustrates a block diagram of an example computing environment for executing the IR adapter using the described architecture. The architecture can be implemented on one or more devices having one or more processors in one or more locations, such as in server computing device 415. User computing device 412 and the server computing device 415 can be communicatively coupled to one or more storage devices 430 over a network 460. The storage device(s) 430 can be a combination of volatile and non-volatile memory, and can be at the same or different physical locations than the computing devices 412, 415. For example, the storage device(s) 430 can include any type of non-transitory computer readable medium capable of storing information, such as a hard-drive, solid state drive, tape drive, optical storage, memory card, ROM, RAM, DVD, CD-ROM, write-capable, and read-only memories.

The server computing device 415 can include one or more processors 413 and memory 414. The memory 414 can store information accessible by the processor(s) 413, including instructions 421 that can be executed by the processor(s) 413. The memory 414 can also include data 423 that can be retrieved, manipulated or stored by the processor(s) 413. The memory 414 can be a type of non-transitory computer readable medium capable of storing information accessible by the processor(s) 413, such as volatile and non-volatile memory. The processor(s) 413 can include one or more central processing units (CPUs), graphic processing units (GPUs), field-programmable gate arrays (FPGAs), and/or application-specific integrated circuits (ASICs), such as tensor processing units (TPUs).

The instructions 421 can include one or more instructions that when executed by the processor(s) 413, causes the one or more processors to perform actions defined by the instructions. The instructions 421 can be stored in object code format for direct processing by the processor(s) 413, or in other formats including interpretable scripts or collections of independent source code modules that are interpreted on demand or compiled in advance. The instructions 421 can include instructions for implementing processes consistent with aspects of this disclosure. Such processes can be executed using the processor(s) 413, and/or using other processors remotely located from the server computing device 415.

The data 423 can be retrieved, stored, or modified by the processor(s) 413 in accordance with the instructions 421. The data 423 can be stored in computer registers, in a relational or non-relational database as a table having a plurality of different fields and records, or as JSON, YAML, proto, or XML documents. The data 423 can also be formatted in a computer-readable format such as, but not limited to, binary values, ASCII or Unicode. Moreover, the data 423 can include information sufficient to identify relevant information, such as numbers, descriptive text, proprietary codes, pointers, references to data stored in other memories, including other network locations, or information that is used by a function to calculate relevant data.

The user computing device 412 can also be configured similar to the server computing device 415, with one or more processors 416, memory 417, instructions 418, and data 419. The user computing device 412 can also include a user output 426, and a user input 424. The user input 424 can include any appropriate mechanism or technique for receiving input from a user, such as keyboard, mouse, mechanical actuators, soft actuators, touchscreens, microphones, and sensors.

The server computing device 415 can be configured to transmit data to the user computing device 412, and the user computing device 412 can be configured to display at least a portion of the received data on a display implemented as part of the user output 426. The user output 426 can also be used for displaying an interface between the user computing device 412 and the server computing device 415. The user output 426 can alternatively or additionally include one or more speakers, transducers or other audio outputs, a haptic interface or other tactile feedback that provides non-visual and non-audible information to the platform user of the user computing device 412.

Although FIG. 4 illustrates the processors 413, 416 and the memories 414, 417 as being within the computing devices 415, 412, components described in this specification, including the processors 413, 416 and the memories 414, 417 can include multiple processors and memories that can operate in different physical locations and not within the same computing device. For example, some of the instructions 421, 418 and the data 423, 419 can be stored on a removable SD card and others within a read-only computer chip. Some or all of the instructions and data can be stored in a location physically remote from, yet still accessible by, the processors 413, 416. Similarly, the processors 413, 416 can include a collection of processors that can perform concurrent and/or sequential operation. The computing devices 415, 412 can each include one or more internal clocks providing timing information, which can be used for time measurement for operations and programs run by the computing devices 415, 412.

The server computing device 415 can be configured to receive requests to process data from the user computing device 412. For example, the environment 400 can be part of a computing platform configured to provide a variety of services to users, through various user interfaces and/or APIs exposing the platform services. One or more services can be a machine learning framework or a set of tools for generating neural networks or other machine learning models according to a specified task and training data. The user computing device 412 may receive and transmit data specifying target computing resources to be allocated for executing a neural network trained to perform a particular neural network task.

The devices 412, 415 can be capable of direct and indirect communication over the network 460. The devices 415, 412 can set up listening sockets that may accept an initiating connection for sending and receiving information. The network 460 itself can include various configurations and protocols including the Internet, World Wide Web, intranets, virtual private networks, wide area networks, local networks, and private networks using communication protocols proprietary to one or more companies. The network 460 can support a variety of short- and long-range connections. The short- and long-range connections may be made over different bandwidths, such as 2.402 GHZ to 2.480 GHz (commonly associated with the Bluetooth® standard), 2.4 GHZ and 5 GHZ (commonly associated with the Wi-Fi® communication protocol); or with a variety of communication standards, such as the LTE® standard for wireless broadband communication. The network 460, in addition or alternatively, can also support wired connections between the devices 412, 415, including over various types of Ethernet connection.

Although a single server computing device 415 and user computing device 412 are shown in FIG. 4, it is understood that the aspects of the disclosure can be implemented according to a variety of different configurations and quantities of computing devices, including in paradigms for sequential or parallel processing, or over a distributed network of multiple devices. In some implementations, aspects of the disclosure can be performed on a single device, and any combination thereof.

Aspects of this disclosure can be implemented in digital circuits, computer-readable storage media, as one or more computer programs, or a combination of one or more of the foregoing. The computer-readable storage media can be non-transitory, e.g., as one or more instructions executable by a cloud computing platform and stored on a tangible storage device.

In this specification the phrase "configured to" is used in different contexts related to computer systems, hardware, or part of a computer program, engine, or module. When a system is said to be configured to perform one or more operations, this means that the system has appropriate software, firmware, and/or hardware installed on the system that, when in operation, causes the system to perform the one or more operations. When some hardware is said to be configured to perform one or more operations, this means that the hardware includes one or more circuits that, when in operation, receive input and generate output according to the input and corresponding to the one or more operations. When a computer program, engine, or module is said to be configured to perform one or more operations, this means that the computer program includes one or more program instructions, that when executed by one or more computers, causes the one or more computers to perform the one or more operations.

While operations shown in the drawings and recited in the claims are shown in a particular order, it is understood that the operations can be performed in different orders than shown, and that some operations can be omitted, performed more than once, and/or be performed in parallel with other operations. Further, the separation of different system components configured for performing different operations should not be understood as requiring the components to be separated. The components, modules, programs, and engines described can be integrated together as a single system, or be part of multiple systems. One or more processors in one or more locations implementing an example architecture according to aspects of the disclosure can perform the operations shown in the drawings and recited in the claims.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the examples should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible implementations. Further, the same reference numbers in different drawings can identify the same or similar elements.

The invention claimed is:

1. An information retrieval (IR) adapter for customizing large language models (LLMs), the IR adapter comprising:
   one or more processors;
   memory comprising instructions, which, when executed, cause the IR adapter to:
   encode, using at least one LLM encoder, a query and a corpus;
   generate, based on the encoding, a query embedding of the query and a corpus embedding of the corpus;
   transform the query embedding to an adapted query embedding, wherein transforming the query embedding comprises:
   determining a difference between the query embedding and the adapted query embedding; and
   minimizing, using at least one recovery loss regularizer, the difference between the query embedding and the adapted query embedding;
   determine a vector similarity between the adapted query embedding and an adapted corpus embedding; and
   determine, based on the vector similarity, an adapted relevance score between the adapted query embedding and the adapted corpus embedding.

2. The IR adapter of claim 1, wherein the query embedding is a numerical vector comprising data that corresponds to the query.

3. The IR adapter of claim 2, wherein transforming the query embedding to the adapted query embedding further comprises transforming the numerical vector comprising data that corresponds to the query to the adapted query embedding.

4. The IR adapter of claim 3, wherein determining the difference between the numerical vector and the adapted query embedding comprises using a skip connection.

5. The IR adapter of claim 4, wherein minimizing the difference between the query embedding and the adapted query embedding comprises minimizing the difference between the numerical vector comprising data that corresponds to the query and the adapted query embedding.

6. The IR adapter of claim 1, wherein the corpus embedding is a numerical vector comprising data that corresponds to the corpus.

7. The IR adapter of claim 1, wherein the instructions, when executed, further cause the IR adapter to transform, using a corpus adapter, a numerical vector comprising data that corresponds the corpus to the adapted corpus embedding.

8. The IR adapter of claim 7, wherein the instructions, when executed, further cause the IR adapter to determine, using a skip connection, a difference between the numerical vector comprising data that corresponds to the corpus and the adapted corpus embedding.

9. The IR adapter of claim 8, wherein the instructions, when executed, further cause the IR adapter to minimize, using at least one recovery loss regularizer, the difference between the numerical vector comprising data that corresponds to the corpus and the adapted corpus embedding.

10. The IR adapter of claim 1, wherein the vector similarity is determined using a cosine similarity function.

11. The IR adapter of claim 1, wherein the determining the adapted relevance score further causes the IR adapter to determine a relationship between the query and the corpus, wherein the relationship is one of a positive relationship or a negative relationship.

12. The IR adapter of claim 11, wherein the determining the relationship between the query and the corpus further causes the IR adapter to compare the adapted relevance score to a ground truth score, wherein the ground truth score indicates a level of correlation between the query and the corpus.

13. The IR adapter of claim 11, wherein an optimal adapted relevance score corresponds to the adapted relevance score of a same order as a ground truth relevance score.

14. The IR adapter of claim 13, wherein the instructions, when executed, further cause the IR adapter to:
   compare the adapted relevance score to the ground truth relevance score; and
   penalize an LLM for predicting a low adapted relevance score when the adapted relevance score is expected to be equal to or greater than the ground truth relevance score.

15. The IR adapter of claim 13, wherein the penalty is proportional to a difference between the adapted relevance score and the ground truth relevance score.

16. The IR adapter of claim 13, wherein the instructions, when executed, further cause the IR adapter to not penalize an LLM when the adapted relevance score is equal to or greater than the ground truth relevance score.

17. A method for customizing large language models (LLMs), the method comprising:
   encoding, by an information retrieval (IR) adapter and using at least one LLM encoder, a query and a corpus;
   generating, by the IR adapter and based on the encoding, a query vector and a corpus vector;
   transforming, by the IR adapter, the query embedding to an adapted query embedding, wherein transforming the query embedding comprises:
   determining a difference between the query embedding and the adapted query embedding; and
   minimizing, using at least one recovery loss regularizer, the difference between the query embedding and the adapted query embedding;
   determining, by the IR adapter, a vector similarity between the adapted query vector and an adapted corpus vector; and
   determining, by the IR adapter and based on the vector similarity, an adapted relevance score between the query and the corpus.

18. The method of claim 17, wherein the query embedding a numerical vector comprising data that corresponds to the query, and
   wherein transforming the query embedding to the adapted query embedding further comprises transforming the numerical vector comprising data that corresponds to the query to the adapted query embedding.

19. The method of claim 17, wherein the determining the adapted relevance score further comprises determining a relationship between the query and the corpus, wherein the relationship is one of a positive relationship or a negative relationship.

20. The method of claim 17, wherein an optimal adapted relevance score corresponds to the adapted relevance score of a same order as a ground truth relevance score.

* * * * *